United States Patent Office 3,849,521
Patented Nov. 19, 1974

3,849,521
OIL- AND WATER-REPELLENT COMPOSITION COMPRISING A POLYMER CONTAINING FLUOROALKYL MONOMER UNITS AND AN ADDITIVE COPOLYMER
Kazusuke Kirimoto, Takao Hayashi, and Hiroaki Kojima, Yokohama, Japan, assignors to Asahi Glass Company Ltd., Tokyo, Japan
No Drawing. Filed Sept. 19, 1972, Ser. No. 290,332
Int. Cl. C08f 29/22
U.S. Cl. 260—900    6 Claims

ABSTRACT OF THE DISCLOSURE

An oil- and water-repellent composition which comprises an oil- and water-repellent polymer containing units of a fluoroalkyl monomer and an additive copolymer containing monomer units of the formula:

$$R_1R_2C=CR_3COOR_4$$

wherein $R_1$, $R_2$ and $R_3$ represent hydrogen atoms or methyl groups, and $R_4$ represents $C_{1-18}$ alkyl groups; and monomer units of the formula:

$$CH_2=CR_5CONHCH_2OH$$

wherein $R_5$ represents a hydrogen atom or a methyl group.

BACKGROUND OF THE INVENTION

Field of the Invention

This invention relates to an oil- and water-repellent composition. More particularly, it relates to an oil- and water-repellent composition containing fluoroalkyl monomer units and a specific copolymer. Heretofore, oil- and water-repellent compositions have been known which contain a polymer prepared from a fluoroalkyl monomer such as an acrylic acid or a methacrylic acid ester containing a perfluoroalkyl group, or a copolymer prepared from a polymerizable fluoroalkyl monomer and a polymerizable monomer such as an acrylic ester, maleic anhydride, chloroprene, butadiene or methylvinyl-ketone.

Description of the Prior Art

Relatively expensive polymers containing perfluoroalkyl groups have been available for some time. Because of the high cost of these materials, various commercial applications have been restricted. In order to overcome the high cost of the fluoroalkyl containing polymers, various proposals for admixing fluoroalkyl polymers with the other economical additive polymers containing no fluoroalkyl groups have been offered. For example, oil- and water-repellent compositions are known which consist of a polymer of a methacrylic acid ester containing a perfluoroalkyl group and the polymer of a polymerizable vinyl compound such as a methacrylic acid ester, butadiene and styrene. The economical polymers, which are admixed with the oil- and water-repellent polymers, must not adversely affect the various physical characteristics of the resulting polymers, especially the oil- and water-repellent characteristics.

Along with the oil- and water-repellent characteristics of the compositions, it is important that the compositions impart durability to washing and dry-cleaning to the impregnated fabrics while preventing a deterioration in the softness and hand feel of the fabric. It is also important that the impregnated fabrics remain repellent to fatty oils, petroleum oils and water as well as repellent to the usual dirty stains such as hand stains and the like. The additive polymers added to the fluoroalkyl containing polymer should not decrease the oil- and water-repellent characteristics and other characteristics of the resulting polymer.

Studies have shown that the conventional additive polymers added to the oil- and water-repellent compositions, such as polymers of an acrylic acid ester, a methacrylic acid ester or styrene, can be used without a decrease in the oil- and water-repellent characteristics of the main polymer. However, the durability, softness and stain-repellency of the impregnated fabrics decrease greatly by mixing small amounts of the additive polymers with the main polymers. A study has been conducted to find economical polymers which can be added to the oil- and water-repellent polymers containing fluoroalkyl groups without decreasing the oil- and water-repellency, durability, stain-repellency and softness of fabrics impregnated with the resulting polymer.

SUMMARY OF THE INVENTION

Accordingly, it is an object of this invention to provide an economical oil- and water-repellent composition which can impart excellent oil- and water-repellency, durability, stain-repellency, softness and hand feeling to fabrics impregnated with the composition.

This object and other objects of this invention can be achieved by providing an oil- and water-repellent composition which contains a polymer containing fluoroalkyl monomer units and a copolymer containing monomer units having the formula:

$$CR_1R_2=CR_3COOR_4$$

wherein $R_1$, $R_2$ and $R_3$ represent hydrogen atoms or methyl groups, and $R_4$ represents $C_{1-18}$ alkyl groups; and monomer units having the formula:

$$CH_2=CR_5CONHCH_2OH$$

wherein $R_5$ represents a hydrogen atom or a methyl group.

DETAILED DESCRIPTION OF THE PREFERRED EMBODIMENTS

In the compositions of this invention, the monomer having the formula:

$$CH_2=CR_5CONHCH_2OH$$

(hereinafter referred to as monomer B) can be N-methylolacrylamide and N-methylolmethacrylamide. The monomer having the formula:

$$CR_1R_2=CR_3COOR_4$$

(hereinafter referred to as monomer A) can be an alkyl crotonate, an alkyl acrylate or an alkyl methacrylate such as methyl acrylate, methyl methacrylate, propyl acrylate, propyl methacrylate, butyl acrylate, butyl methacrylate, isoamyl acrylate, isoamyl methacrylate, 2-ethylhexyl acrylate, 2-ethylhexyl methacrylate, octyl methacrylate, lauryl acrylate, lauryl methacrylate, cetyl acrylate, cetyl methacrylate. One or more of a broad range of monomers A and B can be selected for the preparation of a copolymer of A and B. According to the studies of this invention, it has been found that the copolymer prepared by copolymerizing N-methylolacrylamide or N-methylolmethacrylamide and a $C_{2-17}$ alkyl acrylate or a $C_{4-18}$ alkyl methacrylate provide the most optimum results.

The ratio of monomer A to monomer B is not limited. However, better results can be obtained when the amount of monomer B is not large. It is especially preferable to use a copolymer containing from 90 to 99% by weight units of monomer A and 1–10% by weight units of monomer B. It is possible to use copolymers containing greater quantities of units of monomer B, as well as copolymers containing units of other monomers with units of monomer A and monomer B. The ratio of monomer A to monomer B can be varied depending upon the type of monomers used as well as the type and amount of the oil- and water-repellent polymer desired.

The amount of the additive copolymer incorporated in the oil- and water-repellent composition is not limited, and can be selected depending upon the type of the oil- and water-repellent polymer desired as well as upon the type of additive copolymer used. When the amount of additive copolymer incorporated is too much, the oil- and water-repellency of the resulting composition decreases. When the amount of additive copolymer incorporated is too small, cost reductions of the oil- and water-repellent compositions are not realized. Accordingly, up to 7 parts by weight, especially 0.1–4 parts by weight, of the additive copolymer are usually combined with 1 part by weight of the oil- and water-repellent polymer. The oil- and water-repellent polymers containing fluoroalkyl monomer units can be any one of a variety of polymers including conventional ones. In the preparation of the oil- and water-repellent copolymers of this invention containing fluoroalkyl monomers, conventional monomers can be used for the copolymerization and include unsaturated esters such as the esters of acrylic acid and methacrylic acid containing $C_{3-15}$ perfluoroalkyl groups. Suitable examples include:

$CF_3(CF_2)_7(CH_2)_{11}OCOCH=CH_2$,
$CF_3(CF_2)_4CH_2OCOC(CH_3)=CH_2$,
$(CF_3)_2CF(CF_2)_6(CH_2)_3OCOCH=CH_2$,
$(CF_3)_2CF(CF_2)_{10}(CH_2)_3OCOCH=CH_2$,
$CF_3(CF_2)_6(CH_2)_2OCOC(CH_3)=CH_2$,
$(CF_3)_2CF(CF_2)_6(CH_2)_2OCOCH=CH_2$,
$CF_3(CF_2)_7SO_2N(C_3H_7)(CH_2)_2OCOCH=CH_2$,
$CF_3(CF_2)_7(CH_2)_4OCOCH=CH_2$,
$CF_3(CF_2)_7SO_2N(CH_3)(CH_2)_2OCOC(CH_3)=CH_2$,
$CF_3(CF_2)_7(CH_2)_3COOCH=CH_2$,
$(CF_3)_2CF(CF_2)_6CH_2CH(OH)CH_2OCOCH=CH_2$,
$(CF_3)_2CF(CF_2)_6CH_2CH(OCOCH_3)OCOC(CH_3)=CH_2$.

Non-fluoroalkyl group containing monomers may be copolymerized before copolymerization with fluoroalkyl monomers to form the oil- and water-repellent copolymers of this invention. Suitable non-fluoroalkyl containing monomers include ethylene, vinylacetate, vinylfluoride, vinylidenehalide, acrylonitrile, styrene, α-methylstyrene, p-methylstyrene, acrylic acid, alkyl acrylate, methacrylic acid, alkyl methacrylate, acrylamide, methacrylamide, diacetone acrylamide, methylol diacetone acrylamide, vinylalkylethers, vinylalkylketones, butadiene, isoprene, chloroprene, glycidyl acrylate, maleic anhydride, and mixtures thereof. For example, when styrene or acrylic acid or a methacrylic acid alkyl ester is copolymerized with a fluoroalkyl monomer according to this invention, copolymers are synthesized which have a selective solubility in certain organic solvents such as methylchloroform and trichlorotrifluoroethane. Thus, the copolymers may be advantageously used as aerosols or as organic solvent, soluble oil- and water-repellent compositions.

Other types of fluoroalkyl monomers may be used to form the oil- and water-repellent compositions of this invention, such as:

$CF_2ClCF_3CF(CF_2)_7CONHCOOCH=CH_2$,
$H(CF_2)_{10}CH_2OCOCH=CH_3$, and
$CF_2Cl(CF_2)_{10}CH_2OCOC(CH_3)=CH_2$.

However, it is preferable to use monomers containing perfluoroalkyl groups. It is especially preferable in view of commercial use and availability, to use copolymerizable fluoroalkyl monomers such as the acrylic acid esters or the methacrylic acid esters containing perfluoroalkyl groups having the formula:

$$R_fROCOCR'=CH_2$$

wherein $R_f$ represents straight or branched chain perfluoroalkyl groups containing $C_{3-15}$ carbon atoms, R represents straight or branched chain alkylene groups containing $C_{1-10}$ carbon atoms; and R' represents a hydrogen atom or a methyl group. The quantity of fluoroalkyl monomer in the total quantity of monomers used is at least 25 weight percent, preferably 40 weight percent.

It has been found that oil- and water-repellent polymers having the desired characteristics can be prepared by the polymerization of fluoroalkyl monomer units with units of diacetoneacrylamide, diacetonemethacrylamide, or lower alkylol derivatives thereof (hereinafter referred to as acrylamide derivatives). It is especially preferable to prepare and use oil- and water-repellent polymers containing vinylchloride units together with the aforementioned units.

It has been proposed to use a copolymer prepared by copolymerizing a fluoroalkyl monomer and N-methylolacrylamide or N-methylolmethacrylamide, in order to improve the durability to washing and dry-cleaning characteristics of a polymer impregnated fabric. However, when these copolymers are used for the oil- and water-repellent polymer composition, the following disadvantages have been found. The oil- and water-repellency of the composition initially is decreased, although the durability is increased. Moreover, when these copolymers are applied to fabrics, the softness and hand feel of the fabrics decreases. However, these disadvantages can be overcome by using a copolymer prepared by copolymerizing a fluoroalkyl monomer with diacetoneacrylamide, diacetonemethacrylamide, or lower alkylol derivatives thereof, if desirable, with vinylchloride.

In accordance with this invention, and oil- and water-repellent polymer is admixed with the additive copolymer containing units of monomer B such as N-methylolacrylamide or N-methylolmethacrylamide and units of monomer A such as an alkyl acrylate or an alkyl methacrylate, to prepare the oil- and water-repellent polymer composition. When the compositions of this invention are applied to fabrics, excellent oil- and water-repellency are initially achieved, as well as a durability to washing and dry-cleaning. In addition, the softness and hand feel of the treated fabrics is not decreased. The ratio of the acrylamide derivative, e.g., diacetoneacrylamide to the fluoroalkyl monomer is not limited and can be selected depending upon the type of fluoroalkyl monomer and the type and amount of additive copolymer. When the amount of diacetoneacrylamide or methacrylamide employed is too great, the oil- and water-repellency of the oil- and water-repellent copolymer decreases. Accordingly, less than 15 weight percent of the acrylamide derivatives are usually employed. If less than 0.1 weight percent of the acrylamide derivatives are used, improvements in the durability of the impregnated fabrics is too small. When vinylchloride is copolymerized with the other monomers, from 5 to 50 weight percent of vinylchloride is usually added to the total monomer content. In accordance with this invention, the oil- and water-repellent composition which has basically excellent oil- and water-repellent properties is enhanced in its durability and softness by admixing the oil- and water-repellent copolymer prepared by copolymerizing 0.2–10 weight percent of an acrylamide derivative with a fluoroalkyl monomer with the copolymer prepared by copolymerizing monomer A and monomer B. The oil- and water-repellent compositions prepared as just described are different from conventional compositions and impart excellent oil- and water-repellent properties to an impregnated fabric without decreasing the softness of the treated fabrics.

In order to prepare the copolymers according to this invention, various types and conditions of polymerization reactions can be selected. Any conventional method such as bulk polymerization, solution polymerization, suspension polymerization, emulsion polymerization, radiation polymerization and photopolymerization can be employed. For example, a mixture of the monomers is emulsified in water in the presence of a surface active agent, and the monomers are copolymerized with stirring. Most any polymerization initiator such as a peroxide, an azo compound or a source of ionizing radiation can be employed to initiate the polymerization. The oil- and water-repellent compositions can be prepared in various forms, such as emulsions, solutions, aerosols and the like.

Solution compositions can also be prepared by dissolving the polymers in a suitable organic solvent such as acetone, methylethylketone, diethyl ether, methylchloroform, trichloroethylene, tetrachloroethylene, or chlorofluorohydrocarbons such as tetrachlorodifluoroethane, trichlorotrifluoroethane, or mixtures thereof. When the oil- and water-repellent copolymer is admixed with the additive copolymer prepared from monomer A and monomer B in an organic solvent, the solution type of composition can be directly prepared.

Aerosol compositions can be prepared by packing a solution of a composition together with a propellant such as dichlorodifluoromethane, monofluorotrichloromethane, dichlorotetrafluoroethane, or the like in a can. Various organic solvents can be used to prepare the oil- and water-repellent compositions of this invention so that the composition can easily and economically be used as a solution or an aerosol. Accordingly, the oil- and water-repellent compositions of this invention can be applied by various methods depending upon the form of the compositions and the type of articles treated. For example, when the composition is an aqueous emulsion or a solution composition, the composition is coated on the surface of an article by a conventional dip coating method or any other coating method and dried. If necessary, certain cross-linking agents may be added to cure the composition. When the oil- and water-repellent composition is applied as an aerosol, it is simply sprayed on an article and allowed to dry to impart satisfactory oil-, water- and stain-repellency to the treated fabric.

The oil- and water-repellent compositions of this invention can be applied together with other water-repellent compositions, oil-repellent compositions, insecticides, flameproofing agents, antielectrostatic agents, dye fixing agents, shrink-proofing agents, and the like. The types of articles treated by the oil- and water-repellent compositions of this invention are not limited, and can be fibrous fabrics, glass, paper, wood, leather, wool, asbestos, brick, cement, metal, metal oxides, ceramics, plastics, coating surfaces and plaster. The fibrous fabrics can be any natural fibers such as cotton, hemp, wool, silk; synthetic fibers such as polyamides, polyesters, polyvinylalcohol, polyacrylonitrile, polyvinylchloride, polypropylene, polytetrafluoroethylene; semi-synthetic fibers such as rayon, acetate and glass fibers or mixtures thereof.

Having generally described the invention, a more complete understanding can be obtained by reference to certain specific examples, which are provided herein for purposes of illustration only and are not intended to be limiting in any manner unless otherwise specified.

In the following examples, water-repellency and oil-repellency are shown by the following measuring standards. Water-repellency is measured by the Japan Industrial Standard L-1005 spray method and the scale is shown in Table I. Oil-repellency of the composition is measured by a falling drop in n-heptane and Nujol in the ratios shown in Table II. The falling drop is observed over 3 minutes, and the measurements are shown by the scales in Table II.

TABLE I

| Water-repellency: | Condition |
|---|---|
| 100 | No wetting of the surfaces. |
| 90 | Small wetting of the surfaces. |
| 80 | Visible wetting of the surfaces. |
| 70 | Partial wetting of the surfaces. |
| 50 | Full wetting of the surfaces. |
| 0 | Complete wetting of both surfaces. |

TABLE II

| | Composition (percent volume) of— | |
|---|---|---|
| | n-heptane | Nujol |
| Oil-repellency: | | |
| 150 | 100 | 0 |
| 140 | 90 | 10 |
| 130 | 80 | 20 |
| 120 | 70 | 30 |
| 110 | 60 | 40 |
| 100 | 50 | 50 |
| 90 | 40 | 60 |
| 80 | 30 | 70 |
| 70 | 20 | 80 |
| 60 | 10 | 90 |
| 50 | 0 | 100 |
| 0 | 100% Nujol is not held | |

In the following examples, the + symbol at the right of the numbers in the tables represent a number higher than the base number.

The durability tests were conducted as follows:

In the dry-cleaning test, a fabric treated with the oil- and water-repellent copolymer was stirred in a solution containing 1.0% by weight or by volume of a detergent in tetrachloroethylene at 20° C. for 30 minutes, and dried. In the washing test, the treated fabric was stirred in a solution containing 0.3% by weight or by volume of a detergent in water at 40° C. for 7 minutes and then washed with a water flow at the rate of 600 l./hour for 15 minutes and dried. Washing was conducted in home electric washing machine. The durability of the fabric i.e., washing resistance and the dry-cleaning resistance was shown by the degree of oil- and water-repellency after washing or dry-cleaning the fabrics once and five times.

The stain-repellency tests were conducted as follows:

A 30 g. quantity of the Standard Synthetic Dry Soil having the following formula was filled in a box 30 cm. x 20 cm. x 5 cm. in size. The untreated fabrics and the treated fabrics (7.5 cm. x 5 cm. in size) were placed in the box and severely shaken for one minute to stain the fabrics. The stained fabrics were batted to remove the loose stain and the reflection density of each fabric was measured at 450μ. Stain-repellency was calculated from the reflection density on a scale where 100 designates the stain-repellency of the unstained fabric and 0 designates the stain-repellency of the stain untreated fabric.

STANDARD SYNTHETIC DRY SOIL

| | Weight percent |
|---|---|
| Peat | 38 |
| Cement | 17 |
| Potter soil | 17 |
| Silica | 17 |
| Activated carbon | 1.75 |
| Ferric oxide | 0.5 |
| Mineral oil | 8.75 |

Higher values show a greater stain-repellency. Data having a mark show lower reflection density values than stained untreated fabrics, which show very low stain-repellency value.

The softness tests were conducted as follows:

The stiffness of the untreated fabric and the treated fabric were measured by the Japan Industrial Standard L-1079 slide method, wherein a test fabric 15 cm. in length and 2 cm. in width was used and its bending moment at a length of 5 cm. was measured, and its softness was calculated by the following expression:

$$\text{Softness} = \frac{\text{Stiffness of untreated fabric}}{\text{Stiffness of treated fabric}}$$

Low values indicate a greater softness. The degree of softness of an untreated fabric is assigned a value of one. Hand feel measurements are indicated by 3 words wherein "excellent" means the feel of the treated fabric has the same hand feel as the untreated fabric, "good" means that the feel of the treated fabrics is a rather stiff feeling, and "not good" means that the feel of the treated fabric is quite stiff.

EXAMPLES 1–3 AND REFERENCES 1–4

A cotton 35-polyester 65 fabric (hereinafter referred to as C/E) was used as a test fabric. The oil- and water-repellent compositions contained the copolymer prepared from 73 weight percent of a mixture of compounds of the formula: $CH_2=CHCOOCH_2CH_2(CF_2)_nCF_3$ wherein the ratio of compounds containing values of $n=5, 7, 9$ and $11$ is $4:3:2:0.5$, 25 weight percent vinylchloride and 2 weight percent $CH_2=CHCONHC(CH_3)_2CH_2COCH_3$ (diacetone acrylamide), together with the additive copolymers shown in Table III. The ratio of the main copolymer to the additive copolymer by weight was 50:50. The oil- and water-repellent compositions containing the copolymers of this invention or other copolymers were respectively diluted with water to prepare emulsions containing 1.0 weight percent of the copolymer. Each test fabric was dipped in the emulsion for one minute and squeezed between two rubber rollers until 80% saturated. The treated fabric was dried at 100° C. for 3 minutes and further heated at 150° C. for 4 minutes.

The initial oil- and water-repellency, softness, hand feel and stain-repellency of the treated fabric were measured and the results are shown in Table II. As for the durability tests, oil- and water-repellency were measured after dry-cleaning and washing and the results are shown in Table IV. In Tables III and IV, the test results from a fabric treated with a composition containing no additive are also shown. In Table III, the ratio of monomers for the copolymerization are shown in parentheses (percent by weight).

In Tables III and IV:

N-MAM represents $CH_2=CHCONHCH_2OH$ (N-methylolacrylamide);
BA represents n-butyl acrylate;
2EHA represents 2-ethylhexylacrylate;
2EHMA represents 2-ethylhexylmethacrylate;
St represents styrene;
C represents cotton fabric;
C/E represents cotton 65-polyester 35 fabric.

As is clear from Tables III and IV, the additive copolymer of this invention can be effectively added without reducing the characteristics of the oil- and water-repellent composition. However, other additives causes a reduction of the durability and the stain-repellency of the oil- and water-repellent composition.

EXAMPLES 4–5 AND REFERENCE 5

The cotton fabric and the cotton 35-polyester 65 fabric of Examples 1–3 were used as the test fabrics. In Example 4 and Reference 4, the oil- and water-repellent composition containing the copolymer prepared from 73 weight percent of a mixture of compounds of the formula:

$CH_2=CHCOOCH_2CH_2CH_2(CF_2)_nCF(CF_3)_2$ (wherein the ratio of compounds containing values of $n=4, 6, 8$ and $10$ is $4:3:2:1$), 25 weight percent vinylchloride and 2 weight percent N-methylolacrylamide was used. In Example 5, the composition containing the copolymer prepared from 75 weight percent of a mixture of compounds of the formula:

$CH_2=CHCOOCH_2CH_2(CF_2)_nCF_3$ (wherein the ratio of compounds containing values of

TABLE III

| | Additive copolymer | Test fabric | Initial values of— Oil repellency | Water repellency | Softness | Hand feel | Stain repellency |
|---|---|---|---|---|---|---|---|
| Example 1 | BA/N-MAM (95/5) | C | 120 | 90 | 1.18 | Excellent | 23 |
| | | C/E | 120+ | 90+ | 1.20 | do | 25 |
| Example 2 | 2EHA/N-MAM (95/5) | C | 120 | 90+ | 1.09 | do | 25 |
| | | C/E | 120 | 100 | 1.13 | do | 22 |
| Example 3 | 2EHMA/N-MAM (98/2) | C | 110 | 90 | 1.22 | Fair | 21 |
| | | C/E | 120 | 100 | 1.25 | do | 18 |
| Reference 1 | BA polymer | C | 110 | 80+ | 1.17 | do | 30 |
| | | C/E | 120 | 100 | 1.13 | do | 27 |
| Reference 2 | 2EHA polymer | C | 110 | 90 | 1.01 | Excellent | 39 |
| | | C/E | 120 | 90+ | 1.02 | do | 36 |
| Reference 3 | Ba/St (80/20) | C | 100 | 80+ | 1.41 | Not good | 33 |
| | | C/E | 110 | 90+ | 1.50 | do | 30 |
| Reference 4 | No | C | 120 | 100 | 1.00 | Excellent | 24 |
| | | C/E | 120 | 100 | 1.01 | do | 27 |

TABLE IV

| | Test fabric | Washing resistance | | | | Dry-cleaning resistance | | | |
|---|---|---|---|---|---|---|---|---|---|
| | | After 1 washing | | After 5 washings | | After 1 cleaning | | After 5 cleanings | |
| | | Oil-repellency | Water-repellency | Oil-repellency | Water-repellency | Oil-repellency | Water-repellency | Oil-repellency | Water-repellency |
| Example 1 | C | 100 | 80 | 90 | 70 | 130 | 90 | 120 | 80 |
| Do | C/E | 110 | 90 | 90 | 70 | 130 | 90 | 130 | 80+ |
| Example 2 | C | 90 | 80 | 70 | 70 | 120 | 90 | 120 | 70 |
| Do | C/E | 100 | 80+ | 80 | 70 | 120 | 90 | 120 | 70 |
| Example 3 | C | 90 | 70+ | 70 | 70 | 120 | 80 | 110 | 70 |
| Do | C/E | 90 | 80 | 70 | 70 | 120 | 90 | 120 | 80 |
| Reference 1 | C | 70 | 70 | 50 | 50 | 90 | 70 | 80 | 50 |
| Do | C/E | 110 | 70 | 50 | 70 | 100 | 70+ | 100 | 70 |
| Reference 2 | C | 50 | 70 | 0 | 50 | 70 | 50 | 50 | 50 |
| Do | C/E | 80 | 70 | 0 | 70 | 90 | 70 | 70 | 70 |
| Reference 3 | C | 50 | 50 | 0 | 0 | 60 | 50 | 0 | 0 |
| Do | C/E | 70 | 50 | 0 | 50 | 70 | 70 | 50 | 0 |
| Reference 4 | C | 90 | 80 | 70 | 50 | 110 | 80 | 100 | 70 |
| Do | C/E | 100 | 80+ | 80 | 70 | 120 | 90 | 110 | 80 |

$n=5$, 7, 9 and 11 is 4:3:2:0.5), and 25 weight percent vinylchloride was used. The oil- and water-repellent compositions contained the main copolymer and the additive copolymer according to this invention or other polymers in ratios of 50:50 by weight.

In accordance with Examples 1–3, the fabric was treated with the compositions for measurement of the oil- and water-repellency. The initial oil- and water-repellency, softness, hand feel and stain-repellency of the treated fabric were measured and the results are shown in Table VI. Reference 6 involves the formulation of Example 5 with the exclusion of an additive copolymer. The results are shown in the following tables.

(wherein the ratio of compounds containing values of $n=5$, 7, 9 and 11 is 4:3:2:0.5).

EXAMPLES 6–9

The cotton fabric and the cotton 35-polyester 65 fabric of Examples 1–3 were used as the test fabric. The copolymers prepared from FA, VC and DAAM (diacetoneamide) (the ratio of monomers are shown in the table) were used together with the additive copolymer of the monomers shown in Table VII in a 50:50 by weight ratio to prepare the oil- and water-repellent composition. The fabric was treated in accordance with Examples 1–3. The results of the initial oil- and water-repellency, softness,

TABLE V

| | Additive copolymer | Test fabric | Initial values of— | | | | |
|---|---|---|---|---|---|---|---|
| | | | Oil-repellency | Water-repellency | Softness | Hand feel | Stain repellency |
| Example 4 | 2EHA/N-MAM (97/3) | C | 100 | 80+ | 1.01 | Fair | 29 |
| | | C/E | 100 | 90+ | 0.98 | do | 28 |
| Example 5 | 2EHA/N-MAM (95/5) | C | 110 | 90 | 1.02 | do | 26 |
| | | C/E | 120 | 90+ | 1.00 | do | 24 |
| Reference 5 | 2EHA polymer | C | 100 | 80 | 1.01 | do | 41 |
| | | C/E | 100 | 90+ | 1.01 | do | 40 |
| Reference 6 | FA/VC (75/25) | C | 110 | 90 | 0.99 | do | 28 |
| | No additive | C/E | 110 | 90+ | 0.98 | do | 26 |

TABLE VI

| | Test fabric | Washing resistance | | | | Dry-cleaning resistance | | | |
|---|---|---|---|---|---|---|---|---|---|
| | | After 1 cleaning | | After 5 washings | | After 1 cleaning | | After 5 cleanings | |
| | | Oil-repellency | Water-repellency | Oil-repellency | Water-repellency | Oil-repellency | Water-repellency | Oil-repellency | Water-repellency |
| Example 4 | C | 80 | 80 | 70 | 50 | 100 | 70 | 90 | 7 |
| Do | C/E | 90 | 80 | 70 | 70 | 100 | 80 | 80 | 7 |
| Example 5 | C | 90 | 70 | 70 | 50 | 100 | 80 | 90 | 7 |
| Do | C/E | 100 | 80 | 70 | 70 | 110 | 80 | 110 | 7 |
| Reference 5 | C | 70 | 70 | 50 | 50 | 70 | 70 | 50 | 5 |
| Do | C/E | 90 | 70 | 70 | 50 | 90 | 70 | 70 | 7 |
| Reference 6 | C | 80 | 70 | 50 | 0 | 90 | 70 | 70 | 5 |
| Do | C/E | 100 | 80 | 60 | 0 | 100 | 70 | 80 | 5 |

In Table V, N-MAM, 2EHA, C and C/E are the same as in Table III, VC represents vinylchloride and FA represents

$$CH_2=CHCOOCH_2CH_2(CF_2)_nCF_3$$

hand feel, and stain-repellency of the treated fabric are shown in Table VII. The results of the durability tests are shown in Table VIII. Reference 7 involves the formulation of Example 6 with the exclusion of an additive copolymer. The results are shown in the following tables.

TABLE VII

| | Oil- and water-refellent copolymer composition | Test fabric | Initial values of— | | | | |
|---|---|---|---|---|---|---|---|
| | | | Oil-repellency | Water-repellency | Softness | Hand feel | Stain repellency |
| Example 6 | OWR:FA/VC/MDAAM (70/25/5) | C | 120 | +90 | 1.03 | Excellent | 22 |
| Do | BLD:BA/N-MAM (95/5) | C/E | 120 | +90 | 1.01 | do | 19 |
| Example 7 | OWR:FA/VC/MDAAM (75/23/2) | C | 110 | 100 | 0.98 | do | 24 |
| Do | BLD:LMA/N-MAM (98/2) | C/E | 110 | 100 | 0.97 | do | 23 |
| Example 8 | OWR:FA/VC/MDAAM (72/25/3) | C | 120 | +90 | 1.01 | do | 25 |
| Do | BLD:BA/2EHA/N-MAM (40/55/5) | C/E | 120 | 100 | 0.99 | do | 24 |
| Example 9 | OWR:FA/VC/MDAAM (85/12/3) | C | 110 | 100 | 0.99 | do | 21 |
| Do | BLD:BA/LMA/N-MAM (60/35/5) | C/E | 110 | 100 | 0.99 | do | 24 |
| Reference 7 | OWR of Example 6 | C | 120 | 90 | 1.01 | do | 26 |
| Do | (No BLD) | C/E | 120 | +90 | 0.99 | do | 25 |

TABLE VIII

| | Test fabric | Washing resistance | | | | Dry-cleaning resistance | | | |
|---|---|---|---|---|---|---|---|---|---|
| | | After 1 washing | | After 5 washings | | After 1 cleaning | | After 5 cleanings | |
| | | Oil-repellency | Water-repellency | Oil-repellency | Water-repellency | Oil-repellency | Water-repellency | Oil-repellency | Water-repellency |
| Example 6 | C | +100 | +80 | 90 | 80 | 120 | +80 | 120 | 80 |
| Do | C/E | 110 | 90 | 100 | 80 | 130 | 90 | 120 | 80 |
| Example 7 | C | 90 | +80 | +70 | 70 | 110 | 90 | 100 | +70 |
| Do | C/E | +90 | +80 | 80 | 70 | 110 | 90 | 100 | 80 |
| Example 8 | C | 100 | 80 | 90 | +70 | 130 | 90 | 120 | 80 |
| Do | C/E | 110 | 90 | 100 | +70 | 130 | +90 | 130 | 90 |
| Example 9 | C | +90 | 80 | 80 | 70 | 120 | 90 | 120 | +70 |
| Do | C/E | +90 | 90 | 90 | 70 | 120 | 90 | 120 | +80 |
| Reference 7 | C | 100 | 80 | 70 | 70 | 110 | 80 | 100 | 70 |
| Do | C/E | 100 | 80 | 90 | 70 | 120 | +80 | 120 | 70 |

In Table VII, N-MAM, 2EHA, BA, VC, FA are the same as stated earlier. LMA represents lauryl methacrylate; BLD represents the additive copolymer; and OWR represents the main copolymer for the oil- and water-repellent composition. MDAAM represents methyloldiacetoneacrylamide.

in Table XI. The oil- and water-repellency results after dry-cleaning and after washing are shown in Table XII. References 9 and 10 involved the formulations of Examples 11 and 12 with the exclusion of an additive copolymer.

TABLE XI

| Additive copolymer | | Test fabric | Initial values of— | | | | Stain-repellency |
|---|---|---|---|---|---|---|---|
| | | | Oil-repellency | Water-repellency | Softness | Hand feel | |
| Example 11 | BA/2EHA/N-MMAM (30/68/2) | E | 130 | 100 | 0.99 | Excellent | 21 |
| | | C/E | +120 | 100 | 0.97 | do | 19 |
| Example 12 | BA/2EHMA/N-MMAM (40/45/5) | E | 130 | 100 | 1.04 | do | 18 |
| | | C/E | +120 | 100 | 1.07 | do | 17 |
| Reference 9 | FA/DAAM of Example 11 (98/2) | E | 130 | +90 | 1.00 | do | 18 |
| | (No additive) | C/E | 120 | 90 | 0.98 | do | 20 |
| Refernece 10 | FA/DAAM of Example 12 (95/5) | E | 130 | 100 | 1.02 | do | 17 |
| | (No additive) | C/E | 120 | 100 | 1.01 | do | 19 |

EXAMPLE 10

The oil- and water-repellent composition was prepared by adding the mixture of the main copolymer prepared from 73 weight percent of a mixture of compounds of the formula:

$$CH_2=CHCOOCH_2CH_2CH_2(CF_2)_n(CF_3)_2$$

(wherein the ratio of compounds containing values of $n=4, 6, 8$ and $10$ is $4:3:2:1$), 25 weight percent vinylchloride, 2 weight percent glycidyl methacrylate and the adidtive copolymer prepared from 97 weight percent n-butyl acrylate and 3 weight percent N-methylolacrylamide in a 50:50 ratio by weight. The cotton fabric and the cotton 35-polyester 65 fabric of Examples 1–3 were treated with the oil- and water-repellent composition in accordance with Examples 1–3. Reference 8 involves the formulation of Example 10 with the exclusion of an additive copolymer. The test results of the treated fabric are shown in Tables IX and X.

TABLE IX

| | Test fabric | Initial values of— | | | | Stain-repellency |
|---|---|---|---|---|---|---|
| | | Oil-repellency | Water-repellency | Softness | Hand feel | |
| Example 10 | C | 100 | 80 | 1.05 | Excellent | 30 |
| Do | C/E | 100 | 90 | 1.09 | do | 29 |
| Reference 8 | C | 100 | 80 | 1.03 | do | 31 |
| Do | C/E | 100 | 90 | 1.02 | do | 35 |

TABLE X

| | Test fabric | Washing resistance | | | | Dry-cleaning resistance | | | |
|---|---|---|---|---|---|---|---|---|---|
| | | After 1 washing | | After 5 washings | | After 1 cleaning | | After 5 cleanings | |
| | | Oil-repellency | Water-repellency | Oil-repellency | Water-repellency | Oil-repellency | Water-repellency | Oil-repellency | Water-repellency |
| Example 10 | C | 90 | 80 | 80 | 70 | 100 | 80 | 90 | 70 |
| Do | C/E | 90 | 80 | 80 | 70 | 100 | 80 | 100 | +70 |
| Reference 8 | C | 80 | 70 | 60 | 50 | 100 | 70 | 80 | 70 |
| Do | C/E | 90 | 80 | 70 | 70 | 100 | 80 | 90 | 70 |

EXAMPLES 11–12

The copolymer prepared from FA and DAAM was used as the main copolymer for the oil- and water-repellent composition. In Example 11, the copolymer prepared from 98 weight percent FA and 2 weight percent DAAM was used. In Example 12, the copolymer prepared from 95 weight percent FA and 5 weight percent DAAM was used. A 40 weight percent quantity of the main copolymer was blended with 60% of the additive copolymer shown in Table XI to prepare the oil- and water-repellent composition. The cotton 35-polyester 65 fabric and the polyester fabric (E) were used as the test fabrics. They were treated with the diluted oil- and water-repellent composition (0.5 weight percent of the polymers in solution), in accordance with Examples 1–3. The initial oil- and water-repellency, softness, hand feel and stain-repellency of the treated fabric were measured, and the results are shown

TABLE XII

| | Test fabric | Washing resistance (5 washings) | | Dry-cleaning resistance (5 cleanings) | |
|---|---|---|---|---|---|
| | | Oil-repellency | Water-repellency | Oil-repellency | Water-repellency |
| Example 11 | E | 100 | 80 | 120 | 90 |
| Do | C/E | +70 | 70 | 110 | 80 |
| Example 12 | C | 100 | 80 | 120 | 90 |
| Do | C/E | 90 | +70 | 110 | 80 |
| Reference 9 | E | 100 | 80 | 120 | 80 |
| Do | C/E | 80 | 70 | 110 | 80 |
| Reference 10 | C | +90 | +80 | 120 | 90 |
| Do | C/E | 90 | 80 | 120 | 80 |

In the table, the ratio of monomers in the additive copolymer are shown in parentheses and BA, 2EHA, 2EHMA, FA, DAAM, C/E, and E are the same as stated before. N-MMAM represents $$CH_2=C(CH_3)CONHCH_2OH$$

(N-methylolmethacrylamide).

EXAMPLES 13–14

The polyester fabric and the cotton 35-polyester 65 fabric of Examples 11–12 were used as the test fabrics. In Example 13 and Reference 11, the main copolymer (OWR) prepared from 80 weight percent of a mixture of compounds of the formula:

$$CH_2=C(CH_3)COOCH_2CH_2(CF_2)_nCF_3$$

(wherein the ratio of compounds containing values of $n=5, 7$ and $10$ is $3:2:1$), 16 weight percent styrene and 4 weight percent diacetonemethacrylamide was used. In Example 14 and Reference 12, the main copolymer (OWR) prepared from 72 weight percent $$CH_2=CHCOOCH_2CH_2N(C_2H_5)SO_2C_8F_{17}$$

25 weight percent vinylchloride and 3 weight percent diacetonemethacrylamide was used. The oil- and water-repellent compositions were prepared by using the main copolymer and the additive copolymer shown in Table XIII in a ratio of 60:40 by weight. The fabric was treated with a dilute oil- and water-repellent composition (0.5 weight percent of the polymers), in accordance with Examples 1-3. The initial oil- and water-repellency, softness, hand feel and stain-repellency of the treated fabric were measured, and the results are shown in Table XIII. The oil- and water-repellency results after dry-cleaning and after washing are shown in Table XIV.

TABLE XIII

| | Additive copolymer | Test fabric | Initial values | | | | Stain-repellency |
|---|---|---|---|---|---|---|---|
| | | | Oil-repellency | Water-repellency | Softness | Hand feel | |
| Example 13 | 2EHA/N-MMAM (97/3) | E | 130 | 100 | 1.12 | Fair | 24 |
| | | C/E | 130 | 100 | 1.09 | do | 21 |
| Example 14 | 2EHA/N-N-MAM (98/2) | E | 130 | 100 | 1.10 | Excellent | 22 |
| | | C/E | 120 | +90 | 1.03 | do | 20 |
| Reference 11 | OWR of Example 13 (No additive) | E | 130 | 100 | 1.21 | do | 27 |
| | | C/E | 130 | 100 | 1.24 | do | 23 |
| Reference 12 | OWR of Example 14 (No additive) | E | 130 | 100 | 1.13 | do | 21 |
| | | C/E | 120 | 100 | 1.10 | do | 19 |

TABLE XIV

| | Test fabric | Washing resistance (5 washings) | | Dry-cleaning resistance (5 cleanings) | |
|---|---|---|---|---|---|
| | | Oil-repellency | Water-repellency | Oil-repellency | Water-repellency |
| Example 13 | E | 100 | 70 | 120 | 80 |
| Do | C/E | 90 | +70 | 120 | 80 |
| Example 14 | C | 100 | 80 | 120 | 90 |
| Do | C/E | 90 | 80 | 110 | 90 |
| Reference 11 | E | 90 | 70 | 120 | 80 |
| Do | C/E | 80 | 70 | 100 | 80 |
| Reference 12 | E | 90 | +70 | 110 | +80 |
| Do | C/E | 90 | 70 | 110 | 80 |

EXAMPLES 15–20

The oil- and water-repellent compositions were prepared by blending the main copolymer (OWR) prepared from 72 weight percent FA, 25 weight percent vinylchloride and 3 weight percent diacetoneacrylamide with the additive copolymer (BLD) prepared from 97 weight percent 2-ethylhexylacrylate and 3 weight percent N-methylolacrylamide in the ratio shown in Table XV (FA represents $$CH_2=CHCOOCH_2CH_2(CF_2)_nCH_3$$

(wherein the ratio of fluoroalkyl compounds containing values of n=5, 7, 9 and 11 is 4:3:2:0.5). The cotton 35-polyester 65 fabric (C/E) was treated with the diluted oil- and water-repellent composition containing 0.5 weight percent of the polymers, in accordance with Examples 1-3. The initial oil- and water-repellency and the repellency after dry-cleaning and after washing of the treated fabric were measured, and the results are shown in Table XV.

Having now fully described the invention, it will be apparent to one of ordinary skill in the art that many changes and modifications can be made thereto without departing from the spirit or scope of the invention as set forth herein.

Accordingly, what is claimed as new and intended to be covered by Letters Patent is:

1. In an oil- and water-repellent composition, which comprises:

an oil- and water-repellent polymer containing units of a fluoroalkyl monomer and an additive copolymer containing 90 to 99 weight percent monomer units having the formula:

$$CR_1R_2=CR_3COOR_4$$

wherein $R_1$, $R_2$ and $R_3$ represent hydrogen atoms or methyl groups, and $R_4$ represents $C_{1-18}$ alkyl groups and 1–10 weight percent of monomer units of the formula:

$$CH_2=CR_5CONHCH_2OH$$

wherein $R_5$ represents hydrogen or methyl; the improvement which comprises:

an oil- and water-repellent polymer containing at least 25 weight percent fluoroalkyl monomer units having $C_{3-15}$ per fluoroalkyl groups and containing 15 to 0.1 weight percent acrylamide derivative monomer units selected from the group consisting of diacetoneacrylamide, diacetonemethacrylamide, a lower alkylol diacetoneacrylamide and a lower alkylol diacetonemethacrylamide.

2. The oil- and water-repellent composition of claim 1, wherein the monomer having the formula:

$$CR_1R_2=CR_3COOR_4$$

is a $C_{1-18}$ alkyl acrylate, a $C_{1-18}$ alkyl methacrylate or a $C_{1-18}$ alkyl crotonate, and the monomer having the formula:

$$CH_2=CR_5CONHCH_2OH$$

is N-methylolalkylamide or N-methylolmethacrylamide.

3. The oil- and water-repellent composition of claim 1, wherein one part by weight of said oil- and water-repellent

TABLE XV

| | Ratio of OWR/BLD (percent by weight) | Initial values | | Washing resistance (after 5 washings) | | Dry-cleaning resistance (after 5 cleanings) | |
|---|---|---|---|---|---|---|---|
| | | Oil-repellency | Water-repellency | Oil-repellency | Water-repellency | Oil-repellency | Water-repellency |
| Example 15 | 80/20 | 120 | 100 | 80 | 80 | 110 | 80 |
| Example 16 | 60/40 | 120 | 100 | 80 | 80 | 100 | +80 |
| Example 17 | 50/50 | 120 | 100 | 70 | +70 | 110 | 70 |
| Example 18 | 40/60 | 120 | +90 | 50 | +70 | 90 | 70 |
| Example 19 | 30/70 | 110 | 90 | 50 | 70 | 60 | 50 |
| Example 20 | 20/80 | 90 | 80 | 50 | 70 | 50 | 50 |
| Reference 13 | No BLD | 120 | +90 | 70 | 70 | 100 | 50 |

NOTE.—OWR represents the main copolymer. BLD represents the additive copolymer.

polymer is admixed with 0.1–7 parts by weight of said additive copolymer.

4. The oil- and water-repellent composition of claim 1, wherein said fluoroalkyl monomer is an unsaturated ester containing a $C_{3-15}$ perfluoroalkyl group.

5. The oil- and water-repellent composition of claim 1, wherein the oil- and water-repellent polymer is a copolymer prepared by copolymerizing said fluoroalkyl monomer with another copolymerizable monomer.

6. The oil- and water-repellent composition of claim 1, wherein the copolymer contains at least 40 weight percent fluoroalkyl monomer units, 0.2–10 weight percent of an acrylamide derivative and 5–50 weight percent vinylchloride.

References Cited
UNITED STATES PATENTS

| | | | |
|---|---|---|---|
| 3,544,537 | 12/1970 | Brace | 260—89.5 |
| 3,491,169 | 1/1970 | Raynolds et al. | 260—900 |
| 3,462,296 | 8/1969 | Raynolds et al. | 117—161 |
| 3,547,861 | 12/1970 | Anello et al. | 260—89.5 |
| 3,532,659 | 10/1970 | Hager et al. | 260—29.6 |

PAUL LIEBERMAN, Primary Examiner

C. J. SECCURO, Assistant Examiner

U.S. Cl. X.R.

117—135.5, 138.8 UF, 139.5 A, 140 A, 145 UT; 260—80.73, 890